United States Patent
Stroud et al.

(10) Patent No.: US 8,406,393 B2
(45) Date of Patent: *Mar. 26, 2013

(12) United States Patent

(54) SELECTIVE FACSIMILE DENIAL

(75) Inventors: Kenneth Robert Stroud, Lago Vista, TX (US); Paul A. Raccio, Wallingford, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 656 days.

This patent is subject to a terminal disclaimer.

(21) Appl. No.: 12/636,115

(22) Filed: Dec. 11, 2009

(65) Prior Publication Data
US 2010/0111271 A1    May 6, 2010

Related U.S. Application Data

(63) Continuation of application No. 11/274,364, filed on Nov. 15, 2005, now Pat. No. 7,653,184, which is a continuation of application No. 10/967,100, filed on Oct. 15, 2004, now Pat. No. 7,006,612.

(51) Int. Cl.
*H04M 11/00* (2006.01)
(52) U.S. Cl. .................. 379/93.02; 379/100.01
(58) Field of Classification Search ............... 379/93.02, 379/100.01, 100.16, 100.05, 100.06, 201.02, 379/207.03, 210.02
See application file for complete search history.

(56) References Cited

U.S. PATENT DOCUMENTS

| | | | |
|---|---|---|---|
| 5,060,255 A | 10/1991 | Brown | |
| 5,467,388 A | 11/1995 | Redd, Jr. et al. | |
| 5,936,744 A | 8/1999 | Choi | |
| 6,160,877 A | 12/2000 | Tatchell et al. | |
| 6,239,881 B1 | 5/2001 | Shaffer et al. | |
| 6,647,099 B1 | 11/2003 | Durkin | |
| 6,741,688 B1 | 5/2004 | Yau | |
| 7,006,612 B1 * | 2/2006 | Stroud et al. | 379/100.06 |
| 7,653,184 B2 * | 1/2010 | Stroud et al. | 379/93.02 |

\* cited by examiner

*Primary Examiner* — Stella Woo
(74) *Attorney, Agent, or Firm* — Toler Law Group, PC

(57) ABSTRACT

A system includes a switch responsive to a control module. The control module that determines whether an incoming telephone call from a telephone number to a telephone line is a facsimile call or a voice call and whether facsimile calls are authorized to be routed to the telephone line. When the incoming telephone call is a voice call, the control module instructs a switch to route the incoming telephone call to the telephone line. When the incoming telephone call is a voice call, the control module instructs the switch to route the incoming telephone call to the telephone line when facsimile calls are authorized, and to deny routing the incoming telephone call to the telephone line when facsimile calls are not authorized.

20 Claims, 3 Drawing Sheets

SELECTIVE FACSIMILE DENIAL

REFERENCE TO PRIOR APPLICATION

This is a continuation application of and claims priority from U.S. patent application Ser. No. 11/274,364 filed Nov. 15, 2005, which is a continuation of U.S. Pat. No. 7,006,612 filed on Oct. 15, 2004. The contents of both are incorporated by reference in their entirety.

FIELD OF THE DISCLOSURE

The present disclosure relates to systems for handling incoming facsimile transmissions.

BACKGROUND

Junk faxes and other unwanted advertisements are often transmitted to business facsimile machines. This results in wasted paper and toner and frustration for the business owner and its employees.

Many residential owners of facsimile machines use their telephone line for facsimile purposes only on an occasional, outgoing basis. These facsimile machine owners do not wish to have their phone ring during inconvenient hours due to unwanted, incoming faxes, but still wish to receive incoming voice calls.

BRIEF DESCRIPTION OF THE DRAWINGS

The present disclosure is pointed out with particularity in the appended claims. However, other features are described in the following detailed description in conjunction with the accompanying drawings in which:

DETAILED DESCRIPTION

Figure 1:
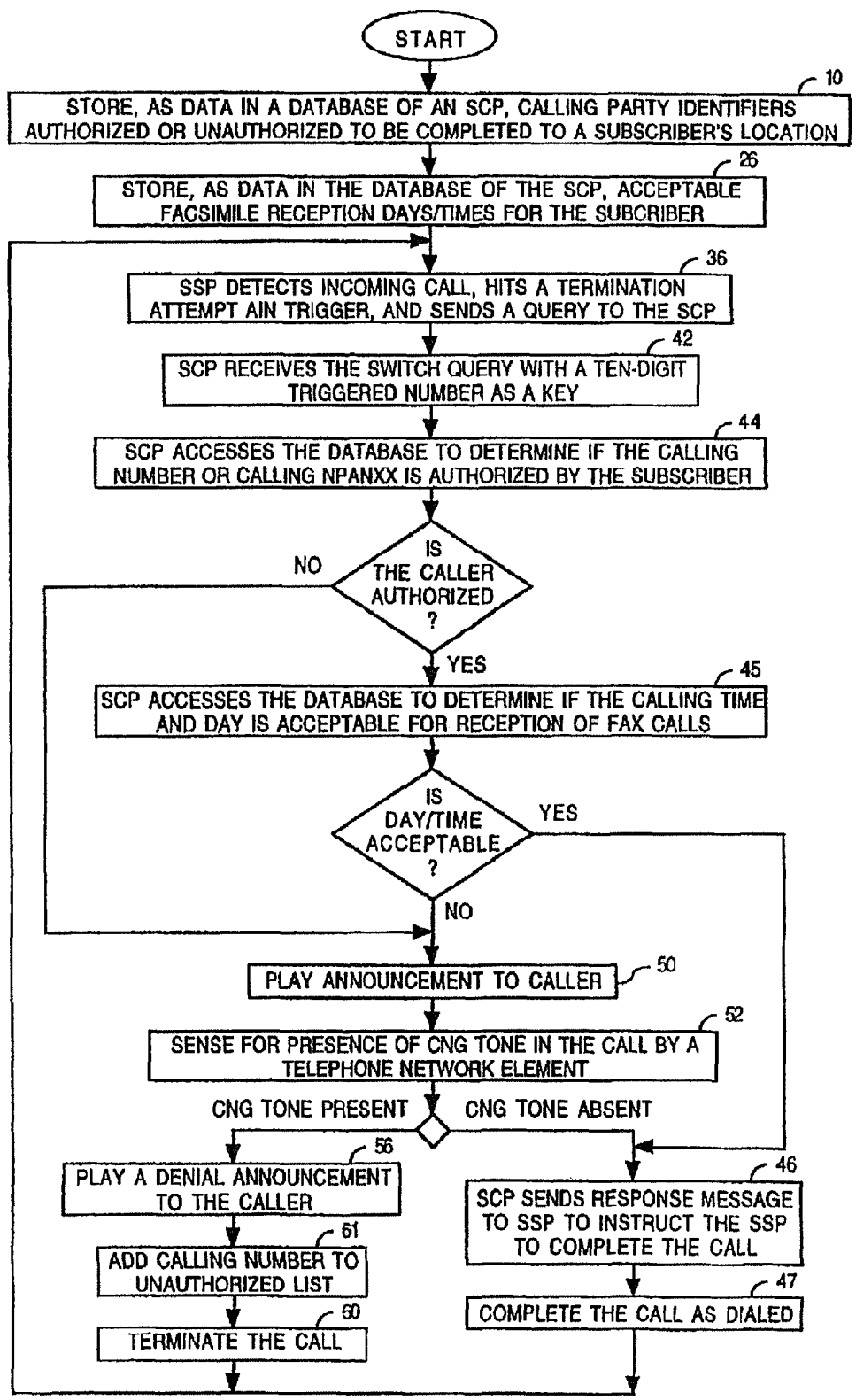
FIG. 1 is a flow chart of an embodiment of a method of blocking unwanted faxes in a telephone network.

In a particular embodiment, a system includes a switch and a control module coupled to the switch. The control module is configured to determine whether an incoming telephone call to a telephone line is a facsimile call or a voice call. The control module is also configured to determine, based on a telephone number associated with the incoming telephone call, whether facsimile calls are authorized to be routed to the telephone line. When facsimile calls are authorized, the control module is further configured to instruct the switch to route the incoming telephone call to the telephone line. When facsimile calls are not authorized and the incoming call is a voice call, the control module is configured to instruct the switch to route the incoming telephone call to the telephone line. The control module is also configured to instruct the switch to deny routing of the incoming telephone call to the telephone line when facsimile calls are not authorized and the incoming call is a facsimile call.

In another particular embodiment, a method also includes detecting an incoming call at switch of a telephone network. The method includes determining whether facsimile calls are authorized to be routed to a destination. The method further includes routing the incoming call to the destination when facsimile calls are authorized. The method includes determining whether the incoming call includes a facsimile tone when facsimile calls are not authorized. The method also includes routing the incoming call to the destination when the incoming call does not include the facsimile tone. The method further includes denying routing of the incoming call to the destination and routing the incoming call to a second destination when the incoming call includes the facsimile tone.

In another particular embodiment, a computer-readable storage medium includes instructions, that when executed by a computer, cause the computer to detect an incoming call and determine whether facsimile calls are authorized to be routed to a destination. The instructions also cause the computer to route the incoming call to the destination when facsimile calls are authorized. When facsimile calls are not authorized, the instructions further cause the computer to selectively route the incoming call to the destination based on whether the incoming call includes a facsimile tone.

Embodiments of the present disclosure block or re-route an unwanted, incoming facsimile transmission call by sensing for a presence of a fax transmission tone within an element of a public telephone network before the telephone network completes the call to a called party. A subscriber-updateable list, table or other data structure that contains authorized calling party identifiers is stored and accessed within the telephone network. The authorized calling party identifiers indicate telephone numbers from which calls are authorized to be completed to the subscriber's location for purposes of fax transmission. The telephone network uses the list to determine whether or not to complete an incoming call as dialed, and whether or not to further analyze the call for the presence of a fax transmission tone, such as a CNG tone. If the telephone network detects the fax tone, the telephone network either blocks or re-routes the incoming call. The telephone network can use an Advanced Intelligent Network (AIN) architecture or alternative architecture to control the handling of calls once the presence or absence of the fax tone is determined.

Figure 2:
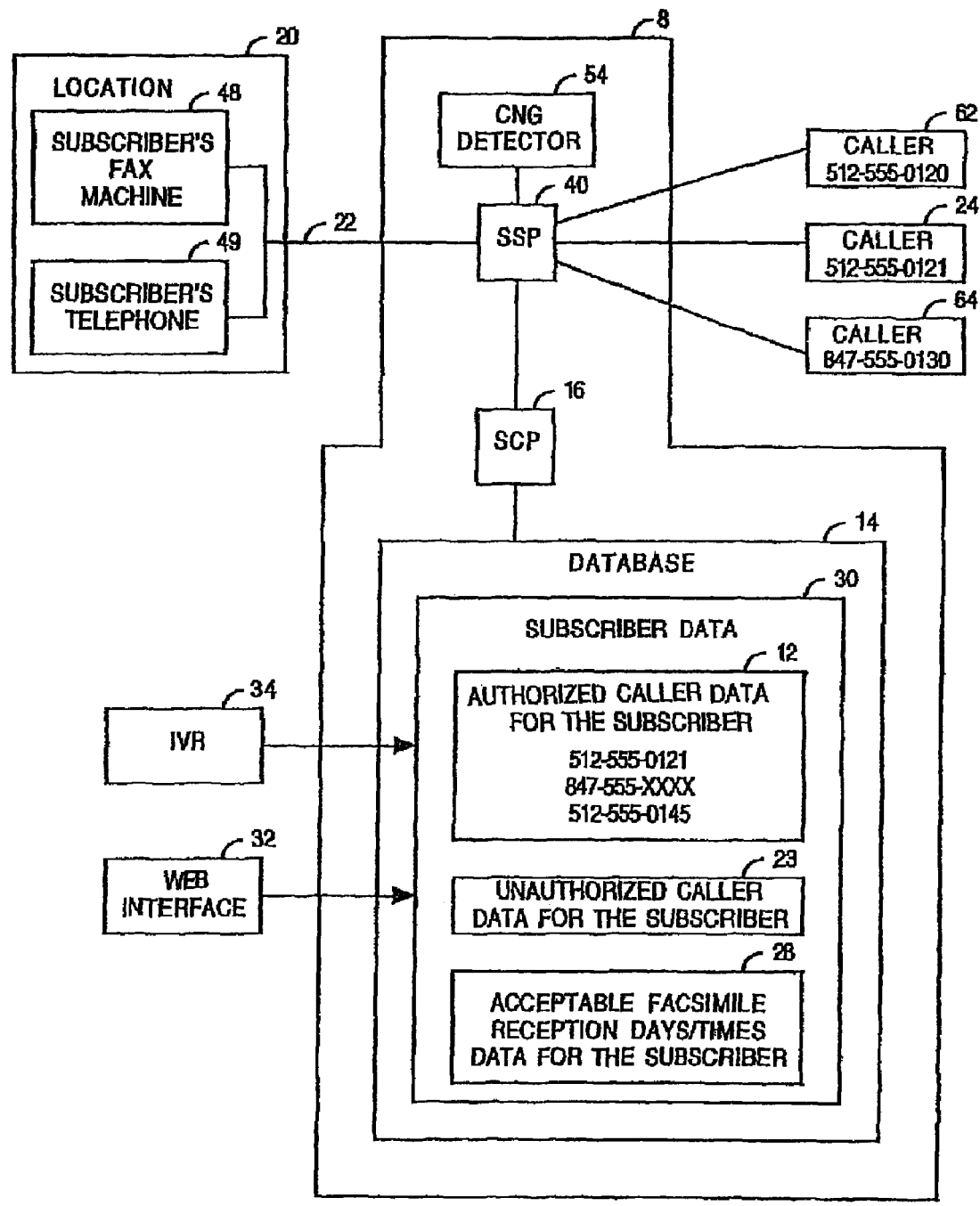
FIG. 2 is a block diagram of an embodiment of a system for blocking unwanted faxes in the telephone network.

Embodiments of the present disclosure are described with reference to FIG. 1, which is a flow chart of an embodiment of a method of blocking unwanted faxes in a telephone network 8, and FIG. 2, which is a block diagram of an embodiment of a system for blocking unwanted faxes in the telephone network 8. The telephone network 8 may be part of a public switched telephone network, a Voice over Internet Protocol (VoIP) telephone network, or a non-traditional phone network.

As indicated by block 10, the method comprises storing, as data 12 in a database 14 of a service control point (SCP) 16, one or more calling party identifiers from which fax transmission calls are authorized to be completed to a telephone line 22 at a subscriber's location 20. Optionally, the database 14 also stores data 23 indicating one or more other calling party identifiers from which fax transmission calls are explicitly unauthorized to be completed to the telephone line 22 at the subscriber's location 20.

The calling party identifiers may comprise ten-digit calling numbers and/or portions of ten-digit calling numbers. An example of a portion of a ten-digit calling number is a six-digit NPA-NXX (number, where NPA is a three-digit area code and NXX are three digits identifying a specific telephone central office in the area code. When included in the authorized data 12, the NPA-NXX data authorizes completion of fax transmission calls from any telephone number having the NPA-NXX. Use of NPA-NXX combinations in the data 12 is useful where the subscriber has a large number of potential callers within the same NPA-NXX. For example, the subscriber may want to receive faxes from a firm whose headquarters is at a single location and has a large number of potential callers within the same NPA-NXX. In this case, the subscriber would not need to store all of the headquarters' ten-digit numbers in the data 12 of the database 14.

For purposes of illustration and example, consider the data 12 indicating that the subscriber has authorized reception of fax transmission calls from a first party 24 whose ten-digit number is 512-555-0121, a second party whose ten-digit number is 512-555-0145, and any party whose NPA-NXX is 847-555. Those having ordinary skill will recognize that the data 12 generally can include any number of authorized calling party identifiers.

Optionally, as indicated by block 26, the method further comprises storing, as data 28 in the database 14 of the SCP 16, days and/or times at which facsimile reception using the telephone line 22 is acceptable or unacceptable to the subscriber. The times may indicate times of day, and the days may indicate specific dates and/or specific days of the week, on which facsimile reception is acceptable or unacceptable. The data 28 is used to provide an additional restriction mechanism for incoming faxes. For example, the subscriber may wish to block all incoming faxes received after business hours.

Subscriber data 30, which includes the data 12, 23 and 28, can be updated by the subscriber using a Web interface 32 and/or an interactive voice response (IVR) system 34. The subscriber can view a visual display of the calling party identifiers from the data 12 or 23 using the Web interface 32, or can hear an audible display of the calling party identifiers from the data 12 or 23 using the IVR system 34. The subscriber can add or remove calling party identifiers (whether they be full ten-digit numbers or NPA-NXX numbers) from the data 12 or 23 by issuing commands using the Web interface 32 and/or the IVR system 34. Further, the subscriber can add or remove days/times to the data 28, or may choose to turn the fax blocking feature on or off by issuing commands using the Web interface 32 and/or the IVR system 34. The IVR system 34 may be receptive to both voice commands and DTMF commands.

Optionally, a telephone network element may automatically add to the data 23 a list of one or more unauthorized calling numbers whose calls to the telephone line 22 have been previously blocked by the subscriber.

As indicated by block 36, a telephone network switch such as a service switching point (SSP) 40 detects an incoming call from a calling party that is intended for the telephone line 22 of the subscriber. Based on detecting the incoming call, the SSP 40 hits a termination attempt advanced intelligent network (AIN) trigger, and sends a query message to the SCP 16 based on the AIN trigger.

As indicated by block 42, the SCP 16 receives the query message with a ten-digit triggered number of the telephone line 22 as the key.

As indicated by block 44, the SCP 16 accesses the subscriber data 30 of the database 14 based on the key. The data 12 of the subscriber data 30 is accessed to determine if the subscriber has authorized reception of incoming faxes from the calling number of the calling party. If the data 12 indicates that the subscriber has authorized reception of incoming faxes from the calling party, then optionally the SCP accesses the data 28 of the database to determine if fax reception is acceptable at the current time and/or day, as indicated by block 45.

If the calling party is authorized based on the data 12 and the time/day is acceptable based on the data 28, then the SCP 16 sends a response message to the SSP 40 to instruct the SSP 40 to complete the call to the telephone line 22, as indicated by block 46. As indicated by block 47, the call is completed to the telephone line 22 as dialed. If the call includes an incoming fax transmission, the subscriber can receive the fax transmission using a fax machine 48 coupled to the telephone line 22. If the call is a voice call, the subscriber can answer the voice call and vocally communicate with the calling party using a telephone 49 coupled to the telephone line 22.

If the calling party is authorized based on the data 12 but the time/day is unacceptable based on the data 28, or if the calling party is unauthorized based on the data 12 or 23, then an act of playing an announcement to the caller is performed as indicated by block 50. The announcement may comprise an audible phrase such as "please hold while we attempt to complete your call" or a recorded ring. Use of the recorded ring makes the call screening process inconspicuous, or ideally indiscernible, to human callers. Regardless of its audible content, the announcement may be a four-second or other duration AIN switch announcement.

As indicated by block 52, a telephone network element senses for a presence of a fax transmission tone from the calling party over the duration of the announcement and before the call has been routed to the telephone line 22. The telephone network element may comprise a plain-old telephone system (POTS) network element or a Voice over Internet Protocol (VoIP) network element, for example.

Sending facsimile machines generate an on-off cadence of fax transmission tones until a receiving facsimile machine generates a response thereto. Thus, the act indicated by block 52 is used by the telephone network to determine whether or not the calling party is sending a fax in the call.

In one embodiment, the fax transmission tone comprises a CNG tone and the response comprises a CED (CallEd station iDentification) tone. An ideal CNG tone comprises a 1100-Hz signal for 0.5 seconds followed by no signal for 3 seconds. According to ITU T.30, an acceptable CNG tone is within a frequency tolerance of ±38 Hz and a timing tolerance of ±15% of the aforementioned ideal CNG tone.

The telephone network comprises a CNG detector 54 to detect if an acceptable CNG tone has been generated by the calling party during the announcement. The CNG detector 54 waits to collect one digit during the announcement. If a digit has not been collected by the end of the announcement (e.g. by the end of about four seconds) or if a collected digit does not equal 1100 Hz±38 Hz, it is assumed that the call is absent an acceptable CNG tone. If the collected digit is within 1100 Hz±38 Hz, it is assumed that the call has an acceptable CNG tone.

If a fax transmission tone from the calling party is present in the call (e.g. the CNG detector 54 detects an acceptable CNG tone), then the call is considered to be a fax call either from an unauthorized calling party based on the data 12 or 23, or at an unacceptable day/time based on the data 28. To block these fax calls from being completed to the telephone line 22, flow of the method is directed to block 56 which indicates an act of playing a denial announcement to the calling party, and block 60 which indicates an act of terminating the call. As an alternative to blocking and terminating these unwanted fax calls, an act of re-routing these fax calls to a different fax machine location having a different telephone line may be performed. Either way, the SSP 40 is instructed by the SCP 16 to deny completion of the call to the telephone line 22. Optionally, as indicated by block 61, the calling party identifier (e.g. the telephone number) of the calling party is added to a list of unauthorized calling party identifiers in the data 23. As a result, the database 14 includes a calling party identifier of the calling party to indicate that subsequent facsimile transmission calls from the calling party are unauthorized to be completed to the telephone line 22 of the subscriber.

If the call is absent a fax transmission tone from the calling party (e.g. the CNG detector 54 does not detect an acceptable CNG tone), then the call is considered not to be a fax call but rather a voice call. Since non-fax calls are allowed to be completed, flow of the method is directed to block 46 which comprises the SCP 16 sending a response message to the SSP 40 to instruct the SSP 40 to complete the call to the telephone line 22. This allows a son/daughter to call his/her parents in the middle of the night even when the telephone network is screening fax calls intended for the parents' telephone line, for example.

The above acts can be repeated for additional incoming calls intended for the telephone line 22.

For purposes of illustration and example, consider how the herein-described method and system process the following three hypothetical calls.

Call 1

The caller 24, whose telephone number is 512-555-0121, places a call to the telephone line 22. Since the telephone number of the caller 24 is an authorized number in a table in the data 12, and the call has been placed during acceptable hours as indicated by the data 28, the telephone network completes the call as dialed. The subscriber may answer the call using either the fax machine 48 or the telephone 49.

Call 2

A caller 62, whose telephone number is 512-555-0120, places a call to the telephone line 22. Since the telephone number of the caller 62 is not in a table of authorized numbers in the data 12, the caller 62 hears an audible announcement such as "please hold while we attempt to complete your call". The call is analyzed, within the telephone network, for a CNG tone. If a CNG tone is present, the call is denied and an audible termination announcement is played to the caller 62. If a CNG tone is not present, the telephone network completes the call as dialed.

Call 3

A caller 64, whose telephone number is 847-555-0130, places a call to the telephone line 22. The NPA-NXX combination of 847-555 of the caller 64 is in a table of authorized numbers in the data 12, however the call is placed after normal business hours as indicated by the data 28. The caller 64 hears an audible announcement such as "please hold while we attempt to complete your call". The call is analyzed, within the telephone network, for a CNG tone. If a CNG tone is present, the call is denied and an audible termination announcement is played to the caller 64 because fax calls are not accepted after normal business hours. If a CNG tone is not present, the telephone network completes the call as dialed.

The herein-disclosed method and system can be used to block and/or re-route incoming facsimile transmissions for multiple subscribers. The database 14 would include respective subscriber data for each subscriber, such as the subscriber data 30 for the example subscriber described herein. Each subscriber would be able to access and modify his/her subscriber data using the Web interface 32 and/or the IVR 34.

Figure 3:
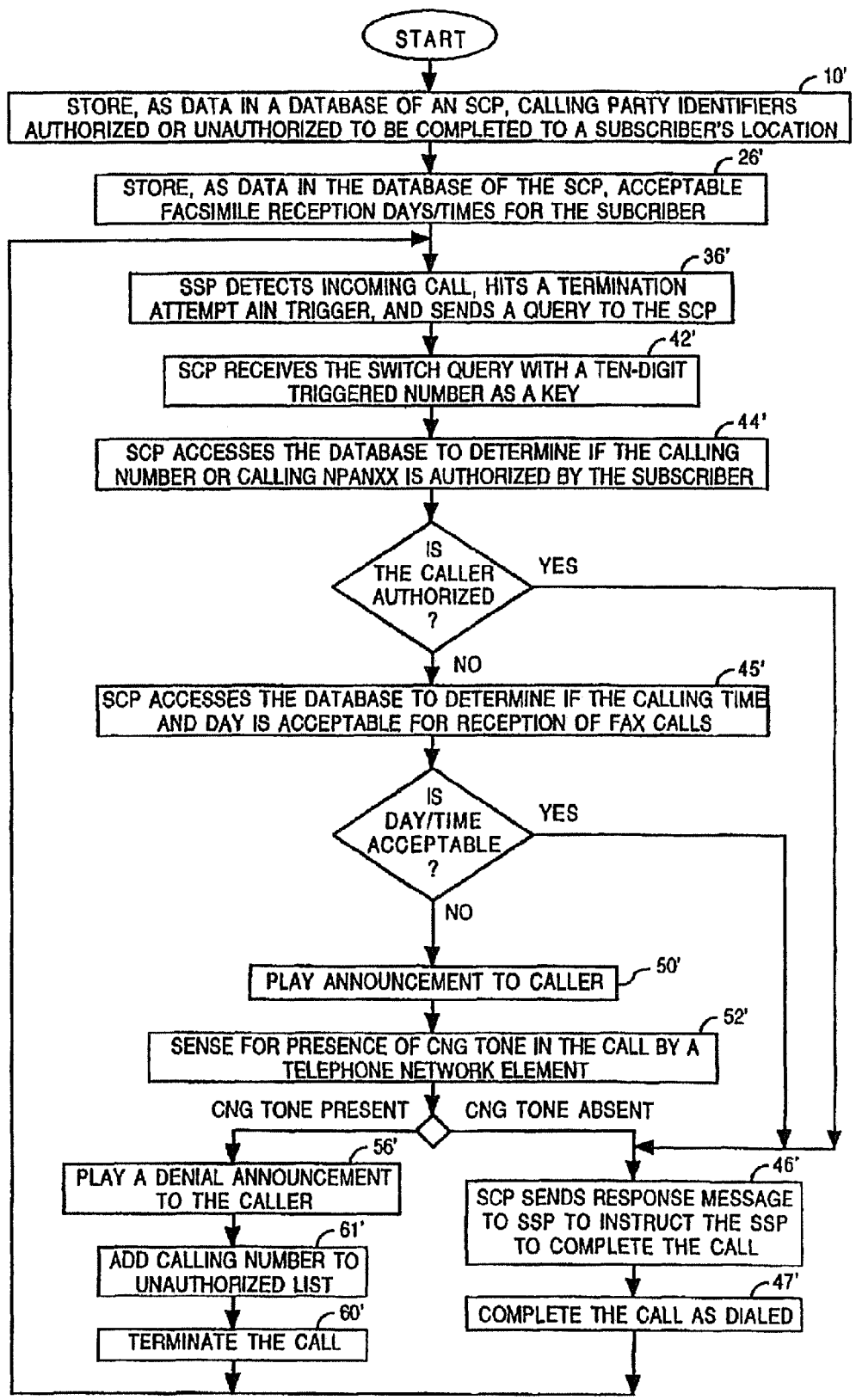
FIG. 3 is a flow chart of another embodiment of a method of blocking unwanted faxes in a telephone network.

FIG. 3 is a flow chart of another embodiment of a method of blocking unwanted faxes in a telephone network. This embodiment includes the same acts described with reference to FIG. 1, but with an alternative flow topology. Each act indicated by a primed reference numeral in FIG. 3 corresponds to a respective act having the same, but non-primed reference numeral in FIG. 1.

The alternative flow topology can be summarized as follows. If the calling party is authorized based on the data 12 or the time/day is acceptable based on the data 28, then the SCP 16 sends a response message to the SSP 40 to instruct the SSP 40 to complete the call to the telephone line 22, as indicated by block 46'. If the calling party is not authorized based on the data 12 or 23 and the time/day is unacceptable based on the data 28, then acts of playing an announcement to the caller and sensing for the presence of a CNG tone are performed as indicated by blocks 50' and 52'.

The acts performed by each of the herein-disclosed components can be directed by respective computer program code embodied in a computer-readable form on a computer-readable medium. Each of the herein-disclosed components may comprise a respective computer processor responsive to the computer program code to perform the acts.

It will be apparent to those skilled in the art that the disclosed embodiments may be modified in numerous ways and may assume many embodiments other than the particular forms specifically set out and described herein.

The above disclosed subject matter is to be considered illustrative, and not restrictive, and the appended claims are intended to cover all such modifications, enhancements, and other embodiments which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system comprising:
 a control module configured to:
  determine whether an incoming telephone call to a telephone line is a facsimile call or a voice call;
  determine, based on a telephone number associated with the incoming telephone call, whether facsimile calls are authorized to be routed to the telephone line;
  when facsimile calls are authorized, instruct a switch coupled to the control module to route the incoming telephone call to the telephone line;
  when facsimile calls are not authorized and the incoming call is a voice call, instruct the switch to route the incoming telephone call to the telephone line; and
  when facsimile calls are not authorized and the incoming call is a facsimile call, instruct the switch to deny routing of the incoming telephone call to the telephone line.

2. The system of claim 1, further comprising a database configured to store restriction information indicating whether facsimile calls from the telephone number are authorized to be routed to the telephone line.

3. The system of claim 2, wherein the control module comprises a service control point and wherein the restriction information comprises a time range.

4. The system of claim 3, wherein the control module is further configured to:
 determine a time of the incoming telephone call;
 instruct the switch to route the incoming telephone call to the telephone line when the time is within the time range; and
 instruct the switch to deny routing of the incoming telephone call to the telephone line when the time is not within the time range.

5. The system of claim 2, wherein the restriction information further includes a list of telephone numbers authorized to make voice calls to the telephone line.

6. The system of claim 5, wherein the control module is further configured to instruct the switch to deny routing of the incoming telephone call to the telephone line when the incoming telephone call is the voice call and when the telephone number is not included in the list of telephone numbers.

7. The system of claim 2, further comprising a web interface to receive the restriction information.

8. The system of claim 2, further comprising an interactive voice response interface to receive the restriction information.

9. The system of claim 1, wherein the control module determines whether the incoming telephone call is the facsimile call based on whether a facsimile tone is included in the incoming telephone call.

10. The system of claim 9, wherein the facsimile tone comprises a CNG tone.

11. The system of claim 10, wherein the CNG tone includes a tone loop comprising a half-second 1100 hertz signal and a three-second silence.

12. The system of claim 11, further comprising a CNG tone detector configured to detect the CNG tone based on an identification of the tone loop.

13. The system of claim 1, wherein the control module is further configured to instruct the switch to route the incoming telephone call to a second telephone line.

14. The system of claim 1, wherein the switch is configured to provide an audible message when denying routing of the incoming telephone call to the telephone line.

15. The system of claim 1, wherein the telephone number comprises ten digits.

16. A method comprising:
- detecting an incoming call at switch of a telephone network;
- determining whether facsimile calls are authorized to be routed to a destination of the incoming call;
- routing the incoming call to the destination when facsimile calls are authorized;
- when facsimile calls are not authorized, determining whether the incoming call comprises a facsimile tone;
- routing the incoming call to the destination when the incoming call does not comprise the facsimile tone; and
- deny routing of the incoming call to the destination and route the incoming call to a second destination when the incoming call comprises the facsimile tone.

17. The method of claim 16, wherein the incoming call is associated with a source, and wherein determining whether facsimile calls are authorized is based on restriction information associated with the destination and with a telephone number of the source.

18. The method of claim 17, wherein the restriction information includes a day range, a time range, or a combination thereof.

19. A computer-readable device storing processor executable instructions that, when executed by a processor, cause the processor to:
- detect an incoming call;
- determine whether facsimile calls are authorized to be routed to a destination of the incoming call;
- route the incoming call to the destination when facsimile calls are authorized; and
- when facsimile calls are not authorized, selectively route the incoming call to the destination based on whether the incoming call comprises a facsimile tone.

20. The computer-readable device of claim 19, wherein selectively routing the incoming call comprises:
- when facsimile calls are not authorized, determining whether the incoming call comprises the facsimile tone;
- routing the incoming call to the destination when the incoming call does not comprise the facsimile tone; and
- routing the incoming call to a second destination when the incoming call comprises the facsimile tone.

* * * * *

UNITED STATES PATENT AND TRADEMARK OFFICE
CERTIFICATE OF CORRECTION

| | | |
|---|---|---|
| PATENT NO. | : 8,406,393 B2 | Page 1 of 1 |
| APPLICATION NO. | : 12/636115 | |
| DATED | : March 26, 2013 | |
| INVENTOR(S) | : Kenneth Robert Stroud et al. | |

It is certified that error appears in the above-identified patent and that said Letters Patent is hereby corrected as shown below:

In the Claims section, Column 6, Line 48, "comprises a service control point and wherein the restriction" should read --comprises a service control point, and wherein the restriction--.

Signed and Sealed this
Eighteenth Day of June, 2013

Teresa Stanek Rea
*Acting Director of the United States Patent and Trademark Office*